US012572676B2

(12) United States Patent
Spencer et al.

(10) Patent No.: US 12,572,676 B2
(45) Date of Patent: Mar. 10, 2026

(54) AUTHENTICATED DOCUMENT STORAGE VAULT

(71) Applicant: Verified Genius Inc., Las Vegas, NV (US)

(72) Inventors: Shawntae DaMar Spencer, Pittsburgh, PA (US); Aminata Jude Ba, Miami, FL (US)

(73) Assignee: Verified Genius Inc., Las Vegas, NV (US)

( * ) Notice: Subject to any disclaimer, the term of this patent is extended or adjusted under 35 U.S.C. 154(b) by 300 days.

(21) Appl. No.: 18/166,488

(22) Filed: Feb. 9, 2023

(65) Prior Publication Data

US 2024/0256688 A1　　Aug. 1, 2024

Related U.S. Application Data

(63) Continuation-in-part of application No. 18/104,062, filed on Jan. 31, 2023, now abandoned.

(51) Int. Cl.
*G06F 21/62*　　(2013.01)
*G06F 21/32*　　(2013.01)

(52) U.S. Cl.
CPC .......... *G06F 21/6209* (2013.01); *G06F 21/32* (2013.01)

(58) Field of Classification Search
CPC ............................. G06F 21/6209; G06F 21/32
USPC .......................................................... 713/193
See application file for complete search history.

(56) References Cited

U.S. PATENT DOCUMENTS 6,587,945 B1　　7/2003　Pasieka
7,257,706 B1 *　8/2007　Zucker .................... H04L 9/083
　　　　　　　　　　　　　　　　　　　　　　713/181

| 9,286,315 B2 * | 3/2016 | Berkebile | ............. G06F 16/178 |
| 2009/0150169 A1 * | 6/2009 | Kirkwood | .............. G06Q 40/00 |
| | | | 705/342 |
| 2010/0171993 A1 * | 7/2010 | Longobardi | ............ G06F 16/93 |
| | | | 358/403 |

(Continued)

FOREIGN PATENT DOCUMENTS

EP　　　　0940945 A2　　9/1999

OTHER PUBLICATIONS

PCT International Search Report Written Opinion, PCT Application No. PCT/US2024/040247, Nov. 18, 2024, ten pages.

*Primary Examiner* — Michael S McNally

(74) *Attorney, Agent, or Firm* — Nath, Goldberg & Meyer; Joshua B. Goldberg

(57) ABSTRACT

A document storage system enables users to send documents received from third-party document providers to a secure vault and subsequently allow the users to provide stored documents to receiving entities in a manner that guarantees that the provided documents have not been modified. Responsive to receiving a user request for a specified document, a providing entity automatically sends the requested document to the document storage system, along with metadata representative of the document, the user, and the providing entity. The document storage system generates a first document fingerprint using the received metadata and stores the document and fingerprint in the vault. When a user requests to share the stored document with a receiving entity, the document storage system generates a second document fingerprint based on document metadata stored in the vault and sends the document and first and second fingerprints to the receiving entity.

17 Claims, 6 Drawing Sheets

(56) References Cited

U.S. PATENT DOCUMENTS

| | | | |
|---|---|---|---|
| 2011/0061092 A1* | 3/2011 | Bailloeul | G06F 3/002 |
| | | | 382/218 |
| 2015/0302210 A1 | 10/2015 | Cimas et al. | |
| 2018/0276745 A1* | 9/2018 | Paolini-Subramanya | |
| | | | H04L 9/50 |
| 2019/0044727 A1* | 2/2019 | Scott | G06F 21/645 |
| 2019/0356670 A1 | 11/2019 | Yaacoby et al. | |
| 2021/0406399 A1 | 12/2021 | Damick | |
| 2023/0100396 A1* | 3/2023 | Iannitti | G06V 30/413 |
| | | | 382/185 |
| 2024/0185339 A1* | 6/2024 | Iannitti | G06V 30/412 |

* cited by examiner

100

200

500

600

AUTHENTICATED DOCUMENT STORAGE VAULT

CROSS REFERENCE TO RELATED APPLICATION

This application is a continuation-in-part of U.S. application Ser. No. 18/104,062, filed Jan. 31, 2023, now abandoned, which is incorporated by reference.

TECHNICAL FIELD

The disclosure generally relates to document storage, and more particularly to a vault system that prevents users from modifying stored documents and guarantees to recipient entities that documents provided by the vault are authenticated.

BACKGROUND

Entities may need to gather information from users who are newly associated with the entity or who wish to connect with the entity, e.g., for the exchange of goods or services. For example, a customer seeking a mortgage from a bank or other financial institution will need to provide large amounts of data as part of the mortgage application process. A new patient at a medical practice may need to provide documents, such as the patient's insurance card and ID, before meeting with a medical professional. And a prospective employee will need to provide documents relating to the employee's educational and employment history as part of the application process. In all of these examples, users may manually retrieve copies of required documents from providing entities via download from a third-party website to the user's computing device and may upload the documents from the device to a receiving entity's website or portal. However, documents provided by the user may be subject to tampering, for example, if a user wished to modify a GPA on a college transcript or falsify medical documents to include vaccines that the user has not received. Modified or edited documents mislead the receiving entity and could cause the entity to make decisions based on inaccurate information, leading to both short and long-term negative consequences.

SUMMARY

Systems and methods are disclosed herein for a secure document storage vault that enables users to directly store documents from third-party document providers and can subsequently allow the users to provide stored documents to receiving entities in a manner that guarantees that the provided documents have not been manipulated or modified.

In one embodiment, a user requests a copy of one or more documents associated with the user from a third-party provider, referred to herein as a "providing" entity. Example providing entities include, but are not limited to employers, financial institutions, educational institutions, payroll providers, medical institutions, governmental institutions, and the like. The user navigates to a webpage or portal associated with the providing entity and selects documents for sending to the document storage vault on a document storage system. The providing entity may require the user to provide authentication information before allowing the user to request the documents. Responsive to receiving the request, the providing entity automatically sends the requested documents to the document storage system, e.g., via a web browser extension or mobile application on the user device. While the user may also download a copy of the document to the user device or print the document, the document is automatically sent from the providing entity to the document storage system without modification, and the user may not modify a document once saved to the vault or upload a document to the vault from the user device.

Documents are stored in the document storage system vault in association with a fingerprint that includes metadata representative of the document and its contents, the user and associated user device, and the providing entity. The fingerprint is unique to the document and changes each time a document is edited. Accordingly, a receiving entity with whom the document has been shared can ensure that a document is authentic and has not been modified by comparing the fingerprint generated when the document was received from the providing entity with a subsequently generated fingerprint sent to or generated by the receiving entity.

Users may share documents with receiving entities, such as prospective employers, mortgage providers, financial institutions, educational institutions, insurance companies, legal entities, and the like by navigating to a user portal on the document storage system and providing document sharing instructions. The receiving entity may require the user to provide one or more types of authentication in connection with the shared document, based, for example, or a type of document or the sensitivity of the document contents. Responsive to the user providing an instruction to share a requested document or approving a request from the document storage system to do so, the document is shared with the receiving entity along with copies of the original and subsequently generated document fingerprints. For example, the document may be made available for viewing on a receiving entity portal of the document storage system, along with an indication of whether the user has fulfilled associated authentication requirements. The receiving entity may compare the received fingerprints to verify that the document has not been modified and contact the user if additional information or documents are required.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a block diagram of a system environment in which a document storage system operates, in accordance with one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Document Storage System Environment

Figure 1:
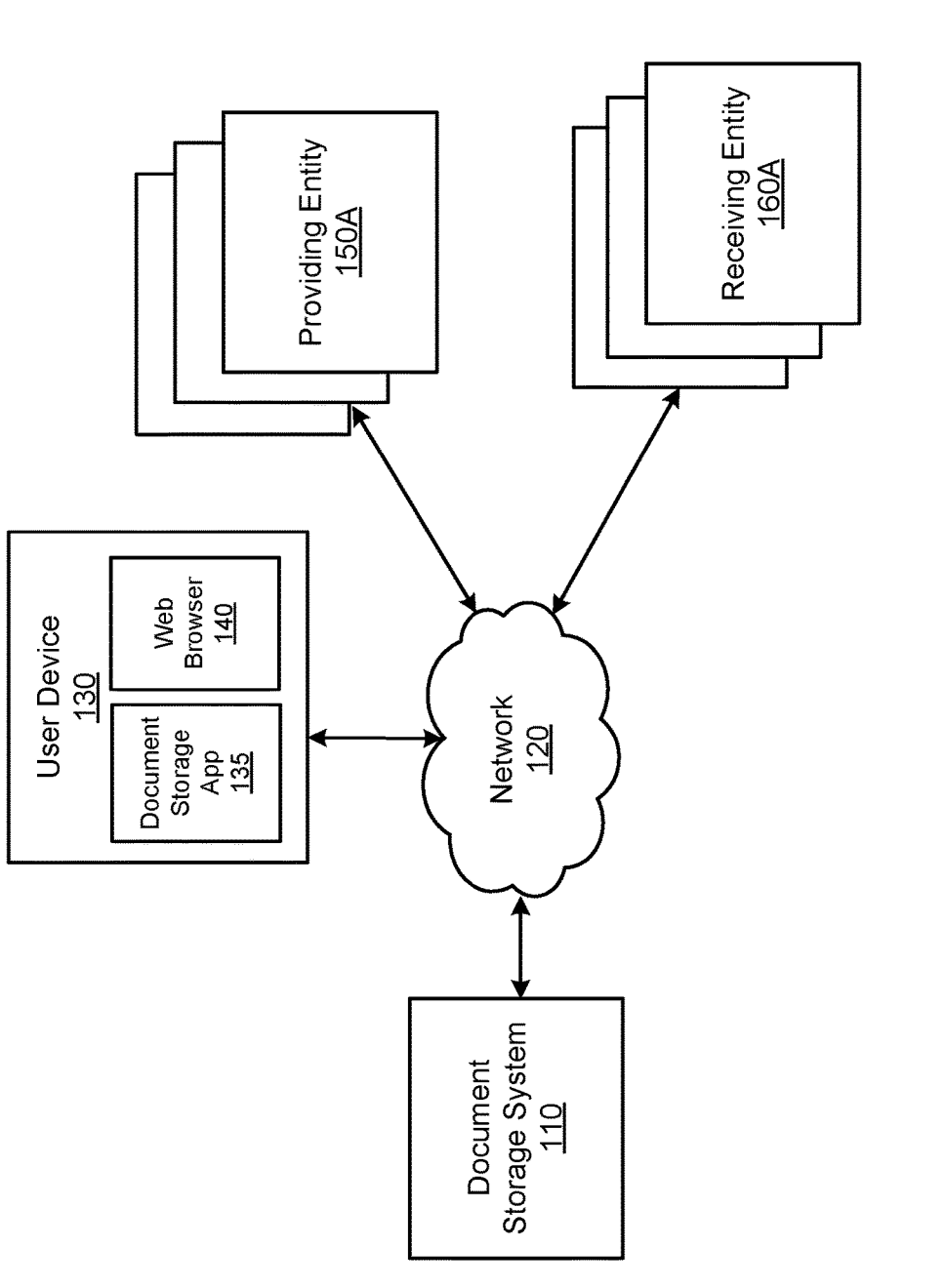

FIG. 1 is a block diagram of a system environment 100 in which a document storage system 110 operates, in accordance with one embodiment. In the embodiment shown in FIG. 1, the system environment 100 includes the document storage system 110, a user device 130 having a document storage application 135 and a web browser 140, one or more providing entities 150, and one or more receiving entities 160, all connected via the network 120. In other embodiments, the system environment 100 contains different or additional elements. In addition, the functions may be distributed among the elements in a different manner than described. Moreover, while three providing entities 150 and three receiving entities 160 and a single user device 130 are shown in FIG. 1 in order to simply and clarify the description, in other embodiments, the system environment includes many providing entities 150 and receiving entities 160 that interact with many user devices 130 associated with users of the document storage system 110.

FIG. 1 uses like reference numerals to identify like elements. A letter after a reference numeral, such as "150A," indicates that the text refers specifically to the element having that particular reference numeral. A reference numeral in the text without a following letter, such as "150," refers to any or all of the elements in the figures bearing that reference numeral. For example, "150" in the text refers to reference numerals "150A," "150B," and/or "150N" in the figures.

The document storage system 110 is a computer system (or group of computer systems) for storing and managing documents for users. Users of the document storage system 110 may directly store documents from third-party document providers, referred to herein as "providing entities" in a vault on the document storage system 110 and share the stored documents and associated metadata with other third-party entities, referred to herein as "receiving entities." The document storage system 110 prevents the user from modifying or editing the stored documents and can guarantee to the receiving entities 160 that the documents stored in the vault and provided to the receiving entities 160 are authenticated and have not been manipulated or modified.

Documents are uploaded to the document storage system 110 via a web browser plug-in or document storage application, such as the application 135, on the user device 130. In one embodiment, the user navigates to a website associated with a providing entity 150 and requests a copy of one or more documents. In another embodiment, the providing entity 150 automatically sends the document(s) to the document storage system 110 (i.e., without user input requesting the document(s)). Example documents include but are not limited to paystubs, employment records, medical records, tax documents, driver's licenses, and other documents with personally identifiable information (PII). The requested document is automatically sent to the document storage system 110 from the providing entity 150 via the plug-in or application and may also be downloaded to the user device 130 or printed. Once the documents are stored in the vault on the document storage system 110, the user may view the documents, share the documents with one or more receiving entities 160, and delete the documents. However, the user may not modify stored documents or upload documents to the document storage system 110 (e.g., from the user device 130).

The document storage system 110 can be a server, server group or cluster (including remote servers), or another suitable computing device or system of devices. Moreover, the document storage system 110 may be a centralized or a decentralized system. For example, the operations can be performed at least in part by software applications of a decentralized system installed on individual user devices 130. In some embodiments, the document storage system 110 interacts with the user device 130, providing entities 150, and receiving entities 160 over the network 120 to receive and provide documents. The modules and corresponding functionalities of the document storage system 110 are discussed in further detail below with respect to FIG. 2.

The network 120 transmits data within the system environment 100. The network 120 may comprise any combination of local area and/or wide area networks, using both wired and/or wireless communication systems, such as the Internet. In some embodiments, the network 120 transmits data over a single connection (e.g., a data component of a cellular signal, or Wi-Fi, among others), and/or over multiple connections. In some embodiments, the network 120 uses standard communications technologies and/or protocols. For example, the network 120 includes communication links using technologies such as Ethernet, IEEE 802.11, 4G, 5G, code division multiple access (CDMA), digital subscriber line (DSL), and the like. Data exchanged over network 120 may be represented using any suitable format, such as hypertext markup language (HTML) or extensible markup language (XML). In some embodiments, the network 120 may include encryption capabilities to ensure the security of customer data. For example, encryption technologies may include secure sockets layers (SSL), transport layer security (TLS), virtual private networks (VPNs), and Internet Protocol security (IPsec), among others.

Through the network 120, the document storage system 110 communicates with the user device 130 associated with a user of the document storage system 110. Each user can be associated with a user account with the document storage system 110. User account information may include a username, email address, or other identifier that can be used by the document storage system 110 to identify the user and to control the ability of the user to provide and share documents using the document storage system 110.

A user device 130 is a computing device capable of receiving user input as well as transmitting and/or receiving data to the document storage system 110 via the network 120. For example, a user device 130 can be a desktop or a laptop computer, a smartphone, tablet, or another suitable device. Each user device 130 may have a screen for displaying content (e.g., documents, images, videos, or other content items) or receiving user input (e.g., a touchscreen). User devices 130 are configured to communicate via the network 120. In one embodiment, a user device 130 executes an application, such as the document storage application 135, allowing a user of the user device 130 to interact with the document storage system 110. Additionally or alternatively, a user can execute the web browser 140 to enable interaction between the user device 130 and the document storage system 110 and between the user device 130, the providing entities 150, and the receiving entities 160. In some embodiments, a single user can be associated with multiple user devices 130, and/or one user device 130 can be shared between multiple users who may for example, log into a personal account on the user device 130 to access the document storage system 110.

The providing entities 150 are one or more third-party entities having documents associated with users of the document storage system 110. Examples providing entities 150 include but are not limited to employers, educational institutions, financial institutions, payroll providers, medical institutions, governmental institutions, and the like.

A user may interact with a providing entity 150 through a providing entity website or portal to request copies of user documents. In one embodiment, the providing entity website is associated with one or more security features, such as a SSL/TLS certificate, to safeguard sensitive data shared between the providing entity 150 and one or more third-party systems, such as the document storage system 110, the user device 130, or the receiving entities 160. A user may have a user account with a providing entity 150 and be prompted to provide authentication information (e.g., a username and password, biometric data) before submitting a document request. In one embodiment, a providing entity 150 may query the document storage system 110 to confirm the user's identity based on a comparison of the authentication information provided by the user and information stored in the vault. For example, a user requesting a copy of tax documents from the Internal Revenue Service (IRS) may be prompted to provide biometric authentication via a fingerprint sensor on the user device 130. The IRS may query the document storage system 110 to confirm that the fingerprint received via the user device 130 matches stored biometric data for the user. In this way, the document storage system 110 acts as a ground truth for user authentication, allowing a providing entity 150 to verify the user's identity before providing sensitive user data.

The receiving entities 160 are one or more third-party entities or individuals requesting documents associated with users of the document storage system 110. Example receiving entities 160 include, but are not limited to, mortgage providers, loan providers, prospective employers, educational institutions, insurance companies, legal entities (e.g., a court, a user's attorney, opposing counsel, etc.), medical institutions, credit agencies, housing providers (e.g., a landlord or rental agency), and the like. A providing entity 150 and a receiving entity 160 may be the same type of entity. For example, a user may be a student at a first educational institution (i.e., the providing entity 150) and request that a copy of the user's student transcript be sent to a second educational institution (i.e., the receiving entity 160).

The receiving entity 160 may request one or more documents from the user via a receiving entity portal on the document storage system 110 or using a separate communication channel (e.g., email, telephone, or an in-person communication). For example, where the receiving entity 160 is a mortgage provider, the receiving entity 160 may specify a list of five documents that the user must provide to allow the receiving entity 160 to process the user's mortgage application. Where all five documents are already stored in the vault on the document storage system 110, the user may instruct the document storage system 110 to send the documents to the receiving entity 160. If one or more of the requested documents are not currently stored in the vault, the user may navigate to a website or portal of a providing entity 150 to retrieve the needed documents, as described above.

In another embodiment, where the user has provided advance authorization, the receiving entity 160 may submit a document request directly to the document storage system 110. For example, the user may instruct the document storage system 110 to automatically send certain documents or document types (e.g., the user's driver's license) to any receiving entity 160 without first querying the user for permission. In another example, the user may instruct the document storage system 110 to send updated user documents to a receiving entity 160 on a specified interval, such as sending the user's paystubs on a biweekly or monthly basis.

After the user has provided authorization to share one or more documents with a receiving entity 160, the documents are sent to the receiving entity 160, for example, displayed on a receiving entity portal on the document storage system 110. In some embodiments, the shared documents may be downloaded to a receiving entity device or printed.

A receiving entity 160 may authenticate a document by comparing an original fingerprint within the document metadata to a subsequently generated fingerprint sent to the receiving entity 160, as discussed below with respect to FIG. 2. The digital fingerprint associated with a document functions as a verification by the document storage system 110 that the document has not been modified by a user. Moreover, a receiving entity 160 may specify one or more additional methods of user verification, based on a sensitivity level of the requested document. For example, where the requested document contains particularly sensitive information, such as a user's tax return, the receiving entity 160 may require the user to provide a biometric scan or voice identification in addition to the authentication data associated with the user's account on the document storage system 110.

Document Storage System

Figure 2:
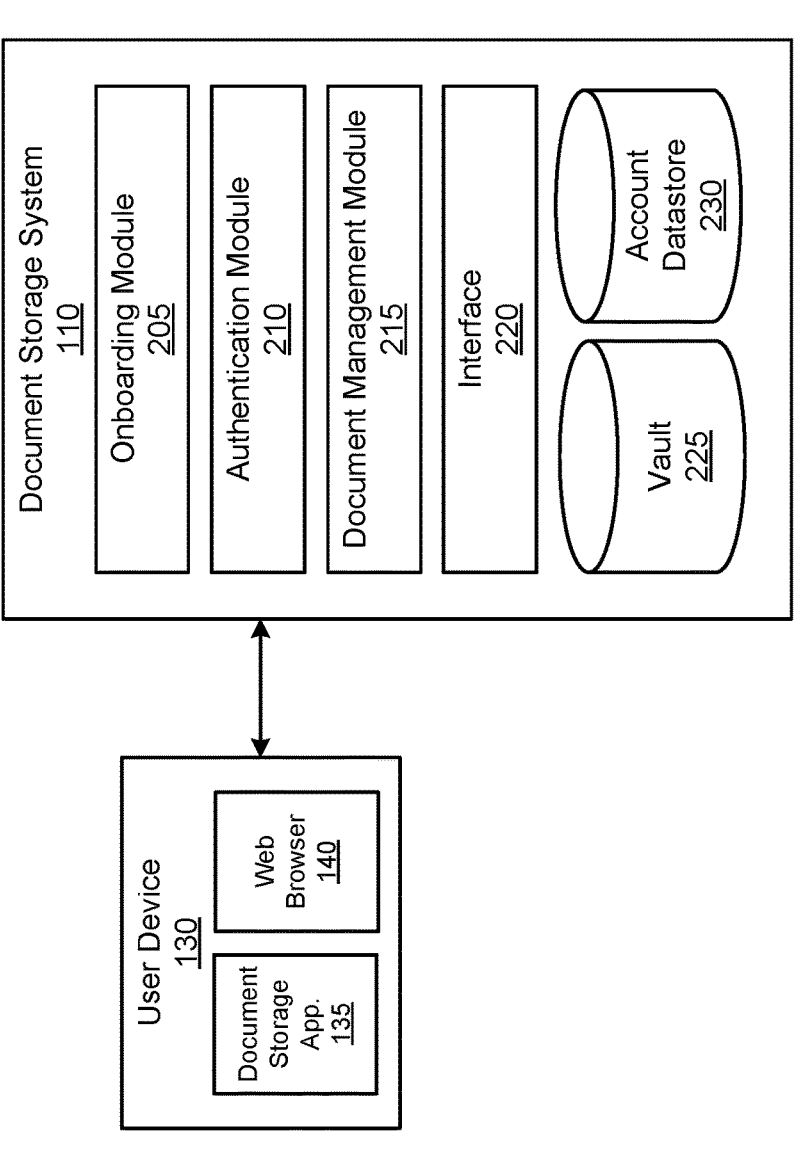
FIG. 2 is a block diagram of the document storage system of FIG. 1, in accordance with one embodiment.

FIG. 2 is a block diagram of a document storage system 110 of FIG. 1, in accordance with one embodiment. In the embodiment shown in FIG. 2, the document storage system 110 includes software modules such as an onboarding module 205, and authentication module 210, and a document management module 215 as well as databases including a vault 225 and an account datastore 230. The document storage system 110 also includes an interface 220, which may include hardware and/or software components that enable the document storage system 110 to communicate with user devices 130 or third-party entities, such as the providing entities 150 and receiving entities 160, through the network 120. The document storage system 110 may have alternative configurations than shown in FIG. 2, including different, fewer, or additional components.

The onboarding module 205 onboards new users to the document storage system 110. In one embodiment, a user onboarding process includes download of the web browser plugin or document storage application 135 on the user device 130 and creation of a user account based on data input by the user and/or automatically retrieved from the client device 130. For example, the onboarding module 205 may prompt the user to input identifying information, such as the user's name and contact information (e.g., email address, phone number, etc.) and to create an account password. The user may also specify one or more providing entities 150 with which the user is associated, such as an employer, educational institution, financial institution, payroll provider, and the like. The onboarding module 205 may also retrieve identifying information of the user device 130, such as an IP address.

During the onboarding process, the authentication module 210 authenticates the user's identity and stores received authentication information in the user account. In one embodiment, the authentication module 210 prompts the user to upload evidence of identity, such as one or more of the user's driver's license, a passport, a selfie image, a voice identification/signal, a fingerprint from a fingerprint sensor from the user device 130, or other biometric identification. In various embodiments, forms of authentication may be specified by providing entities 150 and/or receiving entities 160. For example, the authentication module 210 may receive requests from providing entities 150 or receiving entities 160 for supplemental authentication information based, for example, on a type of document or the purpose of the document to be retrieved and/or shared. If, for instance, the document contains particularly sensitive data, such as a user's tax return, a receiving financial institution may request one or more forms of supplemental information, such as updated biometric data or an additional government-issued ID. Additionally, as discussed above, a providing entity 150 may query the authentication module 210 for biometric or other authentication information to authenticate a user requesting documents via the providing entity website or portal.

In one embodiment, the authentication module 210 also generates fingerprints associated with documents uploaded to the document storage system 110. Alternatively, a first document fingerprint is generated by a providing entity 150 and sent with document metadata to the document storage system 110 for storage in associated with the document. A fingerprint comprises metadata representative of the document, the user and the user device 130, and the providing entity 150 associated with the document. For example, fingerprint data may include one or more of user authentication information (such as a hash of the user's identification or facial recognition data), an IP address of the user device 130 used to retrieve the document, an identification of and information from the providing entity website, such as a SSL/TLS certificate, and identifying information about the document and its contents. Additionally, if a providing entity 150 or receiving entity 160 has requested additional authentication of the user (e.g., where the requested document contains particularly sensitive information), the fingerprint may include one or more additional types of authentication information to supplement the information collected upon account creation. For example, the additional authentication information included in the fingerprint may include an updated biometric scan, an additional form of identification, a voice identification, etc.

The document management module 215 receives documents from providing entities 150, securely stores documents in the vault 225 in association with the generated fingerprints, and provides documents and associated metadata and fingerprints to receiving entities 160 in response to user and/or requesting entity requests. Upon receiving a document from a providing entity 150, the document management module 215 assigns the document to a folder or subfolder in the vault 225. Vault folders and subfolders may be specified by the user via the interface 220 and/or documents may be automatically categorized based on document type (e.g., financial, legal, medical, etc.), document contents, providing entity 150, receiving entity 160, authentication level, authentication details (e.g., driver's license, biometric information, etc.), and the like. Documents may also be stored with an indication of how the associated user was authenticated (e.g., an icon or a narrative description of one or more types of collected authentication information), such that if a requested document does not have the necessary authentication, a receiving entity 160 may request a new copy of the document with the required authentication. Still further, a user may create vault folders or subfolders to organize documents based on the purpose for which they are being shared. For example, where the user is applying for a mortgage, the user can create a folder in the vault 225 to collect documents required by the mortgage lender (e.g., bank statements, paystubs, proof of employment, identification, etc.) and share the entire folder with the receiving entity 160.

Once documents are stored in the vault 225, the document management module 215 allows a user, via the interface 220, to view the documents, share the documents with one or more receiving entities 160 (e.g., by requesting to send a document to a receiving entity 160 or approving a request for a document from the document management module 215 or receiving entity 160), and delete documents from the vault 225. However, the user may not edit documents stored in the vault 225. The document management module 215 enforces this limitation via a comparison between the first fingerprint within the document metadata and a subsequently generated fingerprint provided to the receiving entity 160, as discussed below. The fingerprint comparison thus acts as a verification that the document has not been modified (e.g., by the user) after being stored in the vault 225.

The document management module 215 manages sharing of stored documents with receiving entities 160 in response to user or receiving entity 160 requests. In one embodiment, the user provides input via the interface 220 to grant access to specified documents to one or more receiving entities 160. To do so, the user may provide explicit instruction to share the documents (e.g., via a "Share" icon or other GUI element on the interface 220) or may approve a request from the document management module 215. Where the document management module 215 queries the user for authorization to share one or more documents, the document management module 215 may generate summaries of requested documents and associated requested entities 160 such that the user may approve sharing of multiple documents in a single approval action (e.g., checking a box and clicking "Confirm" or "Approve") instead of requiring the user to approve individual documents in multiple actions.

Additionally, in embodiments where the user has provided advance authorization to do so, the document management module 215 may automatically share the documents with the receiving entity 160 in response to the documents being uploaded to the vault 225. In still other embodiments, the user may provide authorization for a receiving entity 160 to directly request documents from a providing entity 150 and can provide proof of the authorization such that the user does not need to manually request the documents from the providing entity 150.

The document management module 215 may also prompt the user to generate a tiered hierarchy of document share permissions that allows specified documents or categories of documents to be shared with specified receiving entities 160 or categories of receiving entities 160 without requiring explicit approval from the user. For example, the user may instruct the document management module 215 to share the user's driver's license with any receiving entity 160, such as a doctor's or dentist's office at which the user is a new patient. The document hierarchy may also include certain document types or receiving entity categories that require user approval before documents may be shared. For example, the user may specify that the document management module 215 should query the user for sharing permission before sharing any document with the user's social security number or financial account information.

In one embodiment, responsive to receiving a document sharing instruction or authorization from a user, the authentication module 210 generates an updated document fingerprint, and the document management module 215 shares the authorized documents and associated fingerprints with the receiving entity 160. Alternatively, the document management module 215 sends the first document fingerprint generated by the providing entity 150 and the associated metadata to the receiving entity 160. The receiving entity 160 generates a second document fingerprint from the received metadata to authenticate the shared document. To do so, the receiving entity 160 compares the first and second fingerprints. Because any edits to the document file cause a digital fingerprint to change, a match between the first and second fingerprints acts as a verification that neither the user nor any other entity has modified the document.

A receiving entity 160 may access only documents approved by the user and not other documents in the vault 225. Documents can be shared by granting the receiving entity 160 access to the specific document(s) or folder(s) or subfolder(s) where the document(s) are stored. Shared documents may be made available for viewing, download, or printing on a receiving entity dashboard of the document storage system 110. The receiving entity 160 may also use the receiving entity dashboard to request additional documents, view the source of a document, reject a providing entity 150 (e.g., if a SSL certificate leads to a different location than a website associated with the providing entity 150), and contact the user about the provided documents (e.g., if the shared document is not the requested document, is outdated, etc.).

The receiving entity 160 may also view, for each shared document, an indication of the type of authentication associated with the document and whether the receiving entity's authentication requirements have been fulfilled. For example, where the receiving entity 160 has requested both the user's government identification and biometric information, the document management module 215 may provide for display on the receiving entity dashboard icons or other GUI elements indicating that the user has provided the former (e.g., a check mark and a link to the user's driver's license), but not the latter (e.g., an "X" or "Not Provided" text). The receiving entity 160 can use this information to request additional forms of authentication from the user or to take another action (e.g., deny a user's application, continue processing a user's application or otherwise working with the user despite the missing information, etc.).

In one embodiment, the document management module 215 also facilitates the gathering and sharing of a group of requested documents associated with a user. For example, the user may wish to apply for a new job or for a mortgage and need to provide several documents in connection with their application. The receiving entity 160 (here, the prospective employer or mortgage provider, respectively) may provide a list of specified documents to the document storage system 110. The document management module 215 may identify and provide to the receiving entity 160 the authenticated documents from the list that are currently available in the vault 225 and for which the user has provided authorization to share. The document management module 215 can also identify the missing documents to the user and provide an icon or tool within the interface 220 that allows the user to access the missing documents from the source. For example, where the source of the missing document is known (e.g., provided in advance by the user or a receiving entity 160), the document management module 215 can provide a link to a portal associated with the providing entity 150 to allow the user to request that the missing document be sent to the vault 225. Where the source of the missing document is unknown, the document management module 215 can receive an identity of the providing entity 150 from the user and initiate the process of obtaining the document from the providing entity 150. In instances in which a providing entity 150 is unknown (e.g., has not previously provided documents associated with the user or other users to the document storage system 110), the document management module 215 can verify the identity of the providing entity 150 using a variety of techniques, including user identification of the providing entity 150, SSL certificate, contents/properties of a provided document, comparison of the providing entity name to a list of whitelisted/well-known entities, age of the providing entity domain name, requests associated with the providing entity, scan of the providing entity webpage, and the like.

Still further, the document management module 215 can be configured to automatically obtain updated versions of documents (e.g., current paystubs, digital vaccine card, etc.) and can replace previously stored documents with updated versions or store old and new documents together in the vault 225. The user may specify, via the interface 220, a type of document that should be updated, a frequency with which an updated document version should be provided to the vault 225, and a period of time during which updated documents should be sent. For example, the user may request that updated paystubs should automatically be sent from the user's payroll provider on a bi-weekly basis for a year without requiring the user to manually approve a document request or request the updated documents from the providing entity 150. The user may also instruct the document management module 215 to delete paystubs that are older than a specified age, e.g., 90 days. In one embodiment, the document management module 215 notifies the user via the interface 220 if stored documents are out-of-date (e.g., if the user's paystubs or W2 are not recent, if the user's driver's license or passport has expired, etc.).

In another embodiment, the document storage system 110 stores hashed document or user metadata and document fingerprints in the vault 225 without storing the documents with which the metadata and fingerprints are associated. In such an embodiment, the authentication module 210 generates a first document fingerprint responsive to the user submitting a document request via a providing entity 150 website. The requested document may be downloaded to the user device 130 and uploaded (e.g., by the user) to a receiving entity 160 website or portal. The user or receiving entity 160 may request that the document storage system 110 share the fingerprint data associated with the document with the receiving entity 160. The first fingerprint is generated before the document is downloaded to the user device 130 such that the fingerprint may continue to serve as a document verification tool as discussed above. That is, the receiving entity may generate the second fingerprint and compare the first and second fingerprints to ensure that neither the user nor any other entity has modified the document.

The interface 220 is an interface for a user and/or a third-party system, such as a providing entity 150 or a receiving entity 160 to interact with the document storage system 110, as discussed above. The interface 220 may be a web application that is run by a web browser at a user device 130 or a software as a service platform that is accessible by the client device 130 through the network 120. The interface 220 may be the front-end component of a mobile application or a desktop application, such as the document storage application 135. In one embodiment, the interface 220 uses application program interfaces (APIs) to communicate with user devices 130, providing entities 150, and receiving entities 160.

The vault 225 is a secure database that stores documents received from providing entities 150 and associated metadata that comprises a document fingerprint. Documents may be organized into folders and subfolders specified by the user and/or the document storage system 110 based on document type, contents, associated providing and/or receiving entities, authentication level, authentication information, and the like. As discussed above, once stored in the vault 225, may be viewed or removed by the user and shared with receiving entities 160 but may not be modified, thus guaranteeing to receiving entities 160 that the documents stored in the vault 225 and provided by the document storage system 110 are authenticated and have not been tampered with.

The account datastore 230 is a file storage system, database, set of databases, or other data storage system storing information associated with accounts of the document storage system 110. Stored account information may include general user information (e.g., username, password, contact information, etc.), authentication information (e.g., user identification, such as driver's license or passport, biometric identification, etc.), providing entities 150 and/or receiving entities 160 with which the user is associated, indications of one or more documents stored in association with the user, logs of user documents shared with receiving entities 160, user sharing permissions, and the like. A user may provide input through the interface 220 to update account information, for example, to specify permissions for sharing certain stored documents, retrieving updated documents, etc.

In another embodiment, the document storage system 110 facilitates authentication of printed documents in addition to the electronic documents stored in the vault 225. For example, the user may download, e.g., via the interface 220, a print driver to the user device 130. After the print driver software is installed, the user may navigate to a providing entity 150 webpage or portal to request a copy of a user document. As discussed above, when the user submits the document request to the providing entity 150, the authentication module 210 automatically generates a first document fingerprint using hashed document and user metadata and stores the fingerprint in the vault 225.

In addition to or instead of sending a copy of the document to the vault 225, the user may print a hard copy of the document using the print driver installed on the user device 130. In one embodiment, the print driver encodes the fingerprint hash stored in the vault 225 into a linear or matrix barcode (e.g., a QR code) and prints the code directly on the document or on a document cover sheet.

When the printed document is transmitted to a receiving entity 160, the receiving entity 160 may verify the authenticity of the document using the barcode. For example, the receiving entity 160 may require the user to provide an original wet signature (e.g., on a mortgage application), thus necessitating a printed copy of the document. When the user provides the executed document to the receiving entity 160, the receiving entity 160 may use a client device to scan the barcode to match the fingerprint hash printed on the document with the fingerprint hash stored in the vault 225, thus allowing the receiving entity 160 to verify the origins of the document and, optionally, use the barcode to access the digital copy of the document stored in the vault 225.

Example User Interfaces

Figure 3:
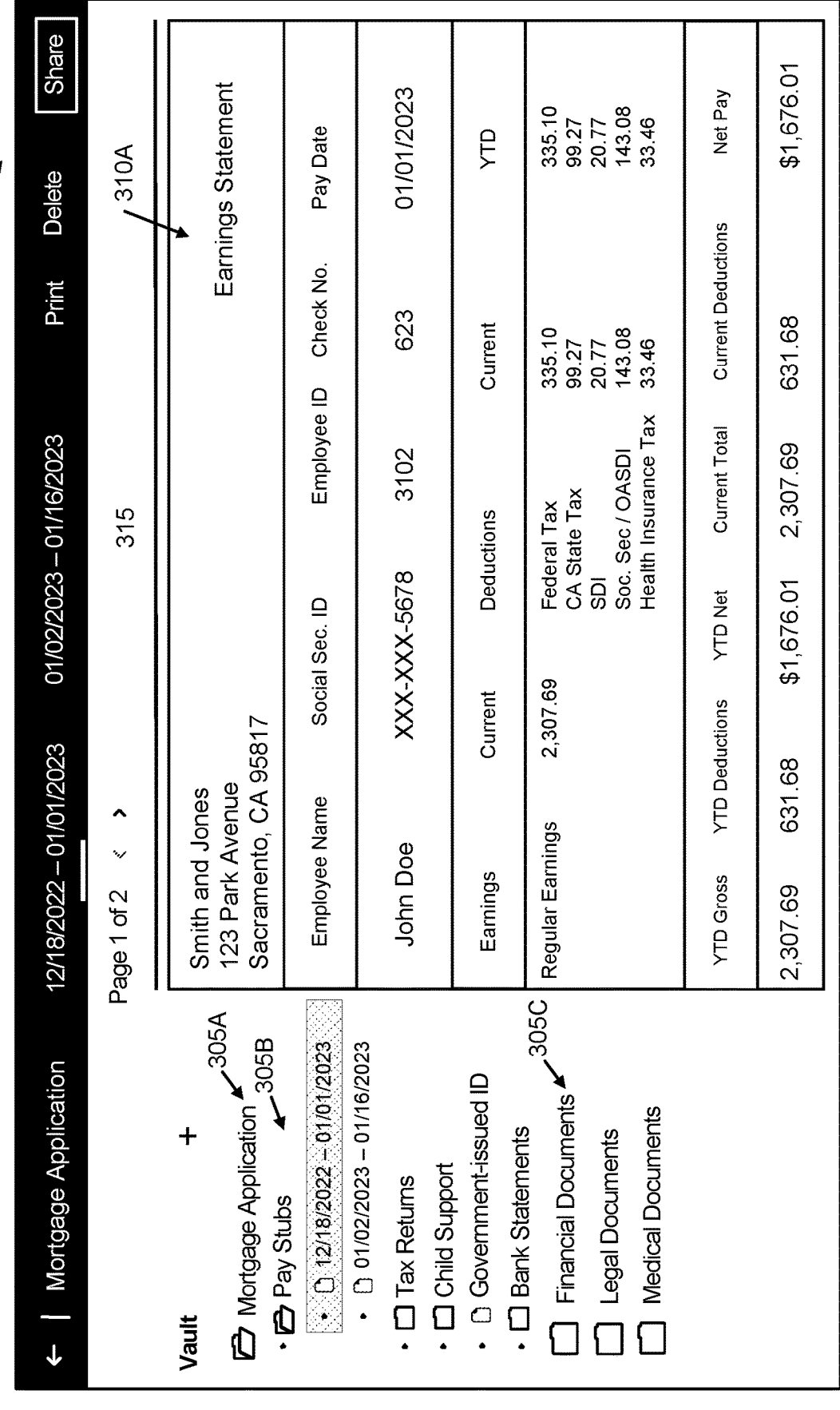
FIG. 3 shows an example vault interface of a user portal on the document storage system, in accordance with one embodiment.

FIG. 3 shows an example vault interface 300 of a user portal on the document storage system 110, in accordance with one embodiment. The interface of FIG. 3 may be displayed via the document storage application 135 or web browser 140 of a user device 130 of a user having an account with the document storage system 110.

In the example shown in FIG. 3, the vault interface 300 includes a series of folders and subfolders 305 containing documents 310 received from providing entities 150, a viewport 315 displaying a selected user document 310A, and interactive elements 320 that allow the user to print, delete, or share a document. As discussed above, documents may be categorized into vault folders and subfolders based on a document collection purpose (such as the "Mortgage Application" folder 305A) and/or document type (such as the "Pay Stubs" subfolder 305B and the "Financial Documents" folder 305C). Folders and subfolders may be created by a user or automatically generated by the document management module 215. For example, the user may create the "Mortgage Application" folder 305A when the user decides to buy a house and may either retain or delete the folder 305A and/or its contents after the purchase process is complete. In some embodiments, the document management module 215 receives or retrieves from the account datastore 230 a list of requested documents (e.g., based on the receiving entity 160) or generates a suggested document list based on the document collection purpose. In the example shown in FIG. 3, a mortgage lender receiving entity 160A may specify, for instance, that the user must submit pay stubs, tax returns, other documents evidencing the user's financial obligations, such as child support payment documents, a government-issued ID, and bank statements. In one embodiment, the document management module 215 automatically creates or prompts the user to create subfolders for each of the requested documents or document types.

The viewport 315 allows a user to view a selected document, such as the document 310A, stored in the vault 225 in connection with the user. For example, the document 310A is a pay stub located in the Pay Stubs 305B subfolder. Viewport interface elements allow the user to navigate between pages of the selected document 310A and select a different document for viewing, such as a subsequent pay stub. Moreover, while not shown in FIG. 3, the viewport may also display other information associated with the selected document 310A, such as authentication information associated with the document collection, a link to the providing entity ("Smith and Jones") website or portal, document update and retention parameters, and an indication of any receiving entities 160 with whom the document has been shared.

The interface elements 320 allow the user to print, delete, or share documents with one or more receiving entities 160. While the example vault interface 300 allows the user to share the displayed document 310A via an interface element 320, in other embodiments, the vault interface 300 includes different and/or additional elements or icons that allow the user to share multiple documents or document folders or subfolders with receiving entities 160 and specify sharing parameters.

Figure 4:
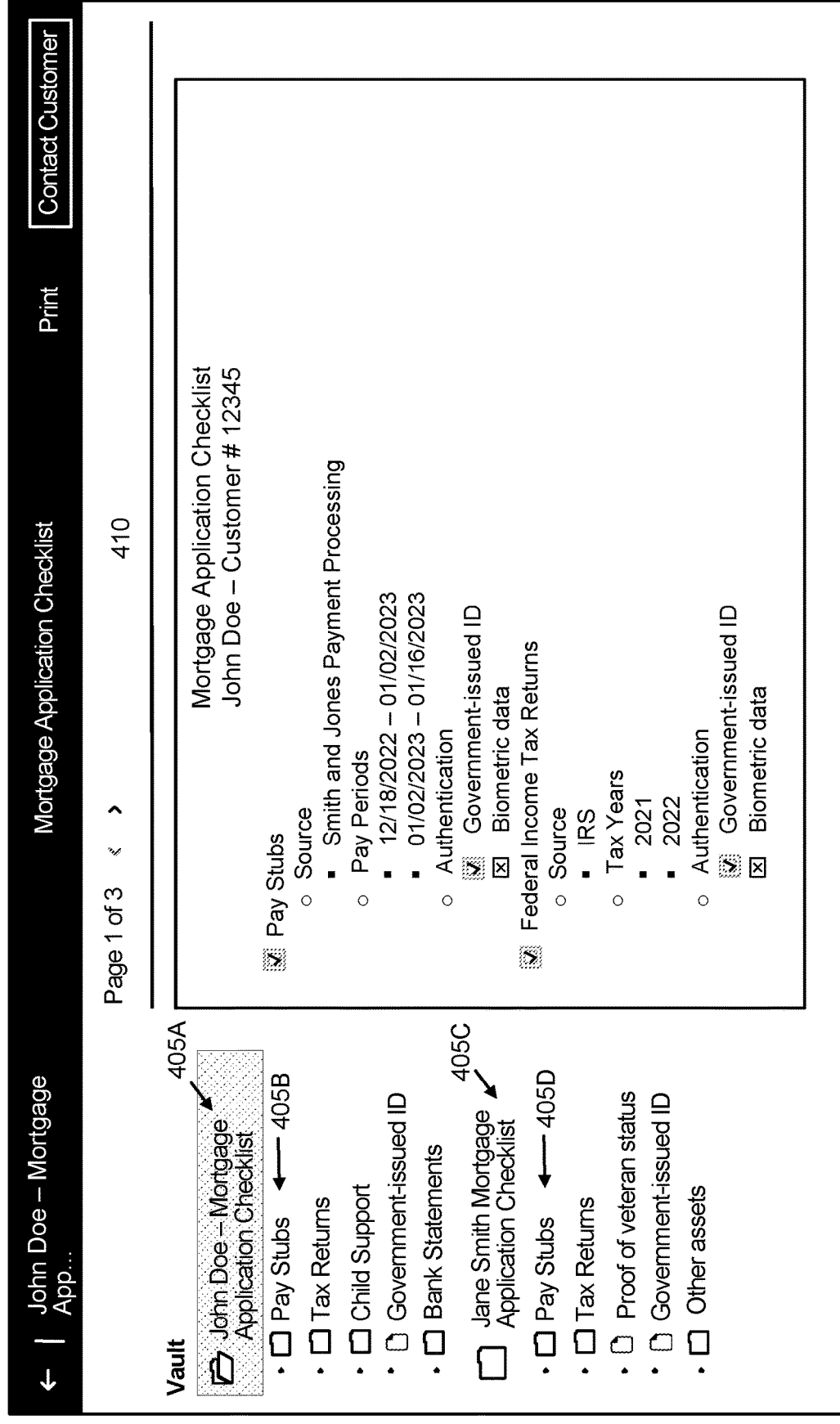
FIG. 4 shows an example vault interface of a receiving entity portal on the document storage system, in accordance with one embodiment.

FIG. 4 shows an example vault interface 400 of a receiving entity portal on the document storage system 110, in accordance with one embodiment. The interface of FIG. 4 may 4 may be displayed via the document storage application 135 or web browser 140 of a user device 130 of a receiving entity 160.

In the example shown in FIG. 4, the vault interface 400 includes a series of folders and subfolders 405 containing documents received from providing entities 150 and shared with the receiving entity 160, a viewport 410 displaying information associated with a user of the document storage system 110, and interactive elements 415. In one embodiment, each folder 405 displayed in the receiving entity portal is associated with a user of the document storage system 110 and a document collection purpose. For example, the folder 405A is associated with a mortgage application for user John Doe while the subfolders 405B contain documents required to process the application and the folder 405C and corresponding subfolders 405D are associated with a mortgage application for a second user, Jane Smith. In other embodiment, a user may be associated with more than one folder 405, for example, if either user later applied to refinance his or her mortgage or applied for a mortgage for a different property.

The viewport 410 allows a receiving entity user to view information associated with a user of the document storage system 110 or a document stored in the vault 225 and shared with the receiving entity 160. For instance, the viewport 410 includes a mortgage application checklist for user John Doe, listing each document required to process the user's mortgage application, along with associated document information, including the providing entity 150, a time period associated with the document(s), one or more forms of authentication associated with the document(s) and an indication of whether the user fulfilled the authentication requirements for the document(s). For example, the mortgage application checklist displayed in the viewport 410 includes icons indicating that the user provided a government-issued ID as authentication for the user's pay stubs and federal income tax returns but did not provide biometric data for either document type. As discussed above, the receiving entity 160 may determine how to proceed with the user's application where required data, such as biometric authentication, has not been provided. For example, the receiving entity user may use an interface element 415 to contact the customer to request the missing information.

The data displayed in association with each collected document in the viewport 410 forms part of the document's fingerprint, which the receiving entity 160 can use to verify that the document is authentic and has not been modified since it was provided by the providing entity 150 and stored in the vault 225. As discussed above, a document's unique fingerprint contains metadata representative of the document, the user and the user device 130, and/or the providing entity. Because any edits to the document cause the fingerprint to change, a match between the first fingerprint provided by the providing entity 150 or generated by the authentication module 210 and the second fingerprint sent to or generated by the receiving entity 160 constitutes document authentication. If the document is not authenticated (e.g., the fingerprints do not match), the receiving entity can request a new document (e.g., via the interface element 415).

Moreover, as discussed above, the document storage system 110 can be configured to automatically obtain more recent versions of documents. For example, while the vault interface 400 indicates that the user's payroll provider, Smith and Jones Payment Processing, has provided two pay stubs, the user can provide advance authorization, e.g., via the interface 300 or via a website or portal associated with the providing entity 150, authorizing the providing entity

150 to automatically send updated pay stubs to the vault 225 as they are issued (e.g., bi-weekly) and, optionally, instruct the document management module 215 to automatically delete stored pay stubs after a specified duration. Where the user has not provided required documents, the interface 400 may include icons or other interface elements indicating that documents are missing, and the document management module 225 can identify missing documents to the user. For example, if the user has not provided bank statements in connection with the mortgage application, the interface 400 may contain an "X" or otherwise visually distinguish the "Bank Statements" item on the Mortgage Application checklist. The document management module 215 may notify the user of the missing documents and, if the user's financial institution is known to the document storage system 110, may provide a link to the financial institution's website to allow the user to request that the missing documents be provided to the vault 225.

Example Document Storage and Provision Method

Figure 5:
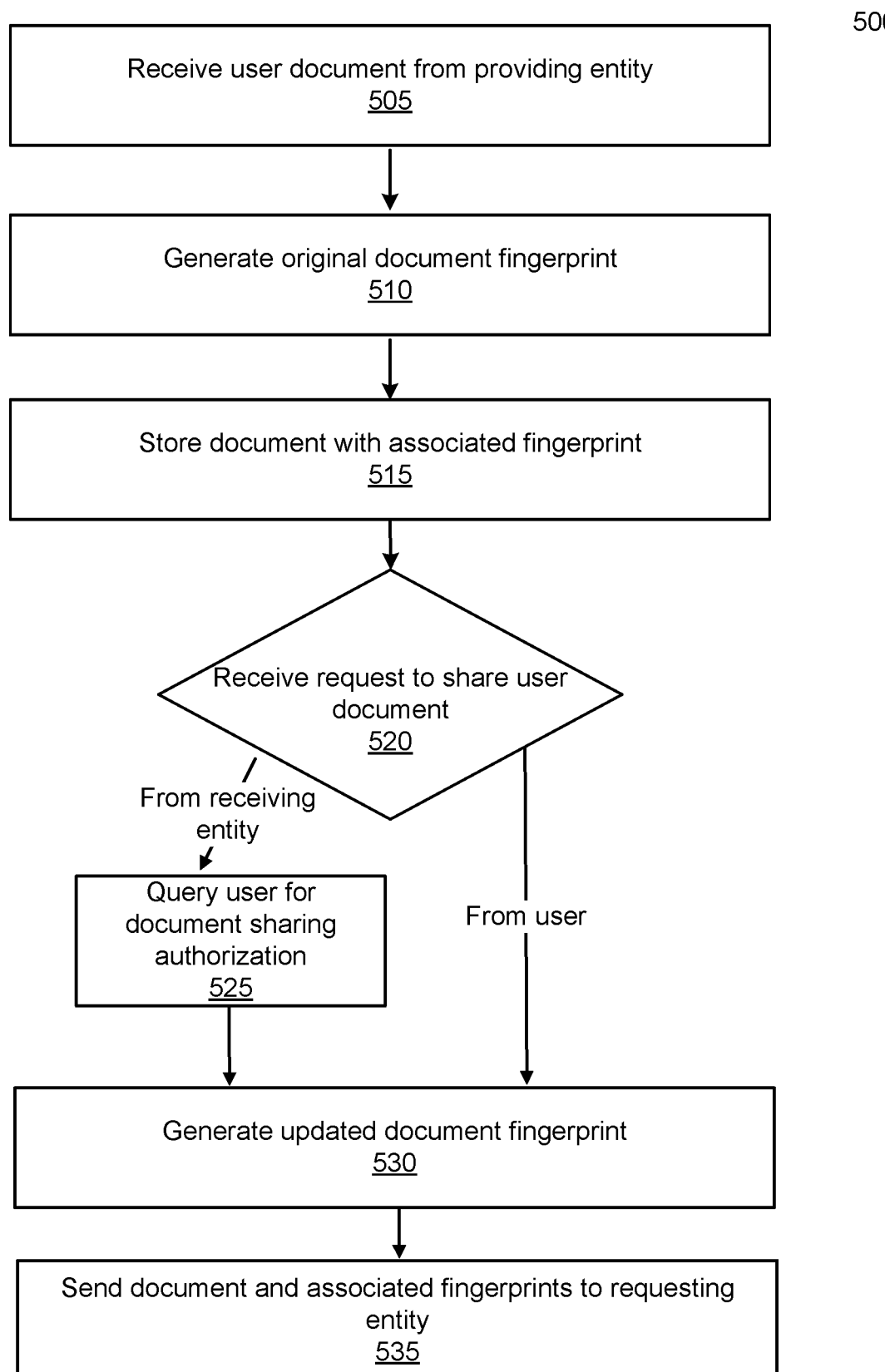
FIG. 5 is a flow chart illustrating an example process for providing authenticated user documents to a receiving entity, in accordance with one embodiment.

FIG. 5 is a flow chart illustrating a method 500 for providing authenticated user documents to a receiving entity, according to one embodiment. The steps of FIG. 5 are illustrated from the perspective of the document storage system 110 performing the method 500. However, some or all of the steps may be performed by other entities and/or components. In addition, some embodiments may perform the steps in parallel, perform the steps in different orders, or perform different steps.

The method 500 begins with the document management module 215 on the document storage system 110 receiving 505 a user document from a providing entity 150. In one embodiment, the providing entity 150 automatically sends the document to the document management module 215 responsive to user input on the providing entity 150 website or portal. For example, as discussed above, the user may download to the user device 130 a web browser plug-in, navigate to the providing entity 150 website and provide log-in or other authentication credentials, and request that a copy of one or more user documents be sent to the document storage system 110 via the plug-in. The requested document and associated metadata are automatically sent from the providing entity 150 to the document storage system 110 for storage in the vault 225.

Responsive to receiving the document and associated metadata from the providing entity 150, the authentication module 210 generates 510 a first document fingerprint comprising information representative of the document and its contents, the user and the user device 130, and the providing entity 150 associated with the document. Alternatively, the first fingerprint is generated by the providing entity 150 and sent to the document storage system 110 with the document and associated metadata. The fingerprint may include user authentication information (such as a hash of the user's identification or facial recognition data), an IP address of the user device 130, information identifying the providing entity 150, such as a SSL/TLS certificate of the providing entity website, supplemental authentication information requested by the providing or receiving entity, and information about the document type and document contents.

The document management module 215 stores 515 the received document with the associated fingerprint in the vault 225. As discussed above, the user or the document management module 215 may create document folders or subfolders to organize documents based on document type or the purpose for which documents are being shared (e.g., in connection with a employment application).

Once documents are stored in the vault 225, the user may view documents, delete documents, reorganize documents into different folders or subfolders, and share documents or folders with receiving entities 160, but may not edit the documents themselves. In one embodiment, the document storage system 110 receives 520 a request to share one or more documents with a receiving entity. The request may be received from a user or via the receiving entity 160. Where the request is received from a receiving entity 160, the document management module 215 queries 525 the user for permission to share the requested documents with the receiving entity 160. The document management module 215 may provide for display with the document sharing request a summary of the one or more requested documents and, optionally, the purpose for which the document is requested (e.g., "ABC Bank needs a copy of your recent paystubs in connection with your mortgage application. Share now?"). Responsive to receiving user permission to share the requested documents, the authentication module 210 generates 530 an updated document fingerprint for each document, and the document management module 215 sends 535 the documents and associated fingerprints to the receiving entity 160, for example, by making the documents and associated fingerprints available for viewing on a receiving entity portal of the document storage system 110. Alternatively, the document management module 215 sends the first fingerprint and associated metadata to the receiving entity 160 such that the receiving entity 160 may generate a second document fingerprint from the metadata and compare the first and second fingerprints to authenticate the document. Where the request to share the documents is received directly from the user (e.g., the user instructs the document storage system 110 to send copies of the user's recent paystubs to ABC Bank), the document management module 215 automatically shares the documents and associated updated fingerprints in response to the user request. As discussed above, shared documents may be displayed to the receiving entity 160 with an indication of whether the user has provided one or more types of required user authentication required by the providing entity 150 or receiving entity 160.

Example Computer System

Figure 6:
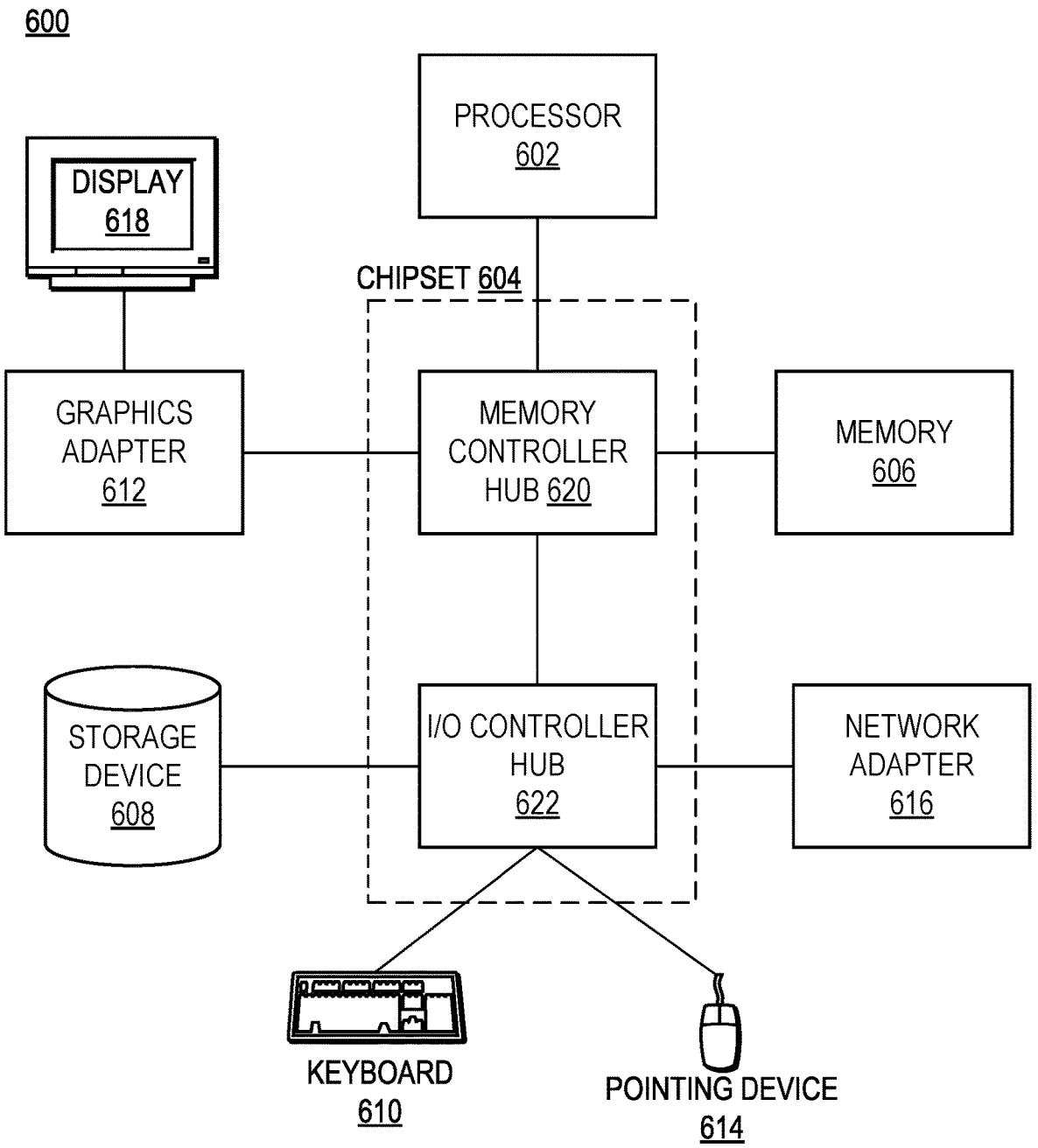
FIG. 6 is a block diagram illustrating components of a computer used as part or all of the document storage system or the user device, in accordance with one embodiment.

The entities of FIG. 1 are implemented using one or more computers. FIG. 6 is an example architecture of a computing device, according to an embodiment. Although FIG. 6 depicts a high-level block diagram illustrating physical components of a computer used as part or all of one or more entities described herein, in accordance with an embodiment, a computer may have additional, fewer, or variations of the components provided in FIG. 6. Although FIG. 6 depicts a computer 600, the figure is intended as functional description of the various features that may be present in computer systems than as a structural schematic of the implementations described herein. In practice, and as recognized by those of ordinary skill in the art, items shown separately could be combined and some items could be separated.

Illustrated in FIG. 6 are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604. In some embodiments, the computer 600 includes one or more communication buses for interconnecting these components. The one or more communication buses optionally include circuitry (sometimes called a chipset) that interconnects and controls communications between system components.

The storage device 608 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 608 can also be referred to as persistent memory. The pointing device 614 may be a mouse, track ball, or other type of pointing device, and is used in combination with the keyboard 610 to input data into the computer 600. The graphics adapter 612 displays images and other information on the display 618. The network adapter 616 couples the computer 600 to a local or wide area network.

The memory 606 holds instructions and data used by the processor 602. The memory 606 can be non-persistent memory, examples of which include high-speed random-access memory, such as DRAM, SRAM, DDR RAM, ROM, EEPROM, flash memory.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for operating a data management system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
receiving, by a document storage system and from a providing entity, one or more documents associated with a user of the document storage system and metadata for each of the one or more documents;

generating, by the document storage system for each of the one or more documents, a first document fingerprint using the received metadata;

storing, by the document storage system, the one or more documents and corresponding fingerprints in a document storage vault in association with the user, wherein the user is unable to modify documents stored in the document storage vault;

receiving, by the document storage system, a request from the user to share at least one of the one or more documents with a receiving entity;

determining, by the document storage system, that the user has provided permission to share the requested documents with the receiving entity;

generating, by the document storage system, a second document fingerprint for each of the requested documents using document metadata stored in the document storage vault;

sending, by the document storage system, the requested documents and an indication that the requested documents have not been modified based on the associated first and second fingerprints to the receiving entity;

receiving, by the document storage system and from the receiving entity, a list of one or more additional documents associated with the user and required to process a user application with the receiving entity;

identifying, by the document storage system, a first subset of the required documents stored in the document storage vault;

identifying, by the document storage system, a second subset of the required documents not stored in the document storage vault; and querying, by the document storage system, the user to share the first subset of documents and notifying the user that the second subset of documents are not stored in the document storage vault.

2. The method of claim 1, wherein the document fingerprints comprise information identifying the document and document contents, the user and an associated user device, and the providing entity and wherein the receiving entity authenticates the one or more requested documents based on a comparison of the first and second fingerprints.

3. The method of claim 2, further comprising:
receiving, by the document storage system and from the receiving entity, one or more forms of required user authentication associated with the one or more requested documents;

querying, by the document storage system, the user via a user device to provide the one or more forms of required user authentication;

receiving, by the document storage system, user authentication information from the user device; and displaying, by the document storage system, an indication of the received authentication information in association with the one or more requested documents.

4. The method of claim 3, wherein the document fingerprints include received user authentication information.

5. The method of claim 1, further comprising:
receiving, by the document storage system and from a second receiving entity, a request to share at least one of the one or more documents; and querying, by the document storage system, a user device for permission to share the at least one document.

6. The method of claim 1, wherein the document storage system is configured to automatically obtain updated versions of user documents from providing entities and store the updated documents in association with the user in the document storage vault.

7. A non-transitory computer readable storage medium comprising computer executable instructions that when executed by one or more processors causes the one or more processors to perform operations comprising:

receiving, by a document storage system and from a providing entity one or more documents associated with a user of the document storage system and metadata for each of the one or more documents;

generating, by the document storage system for each of the one or more documents, a first document fingerprint using the received metadata;

storing, by the document storage system, the one or more documents and corresponding fingerprints in a document storage vault in association with the user, wherein the user is unable to modify documents stored in the document storage vault;

receiving, by the document storage system, a request from the user to share at least one of the one or more documents with a receiving entity;

determining, by the document storage system, that the user has provided permission to share the requested documents with the receiving entity;

generating, by the document storage system, a second document fingerprint for each of the requested documents using document metadata stored in the document storage vault;

sending, by the document storage system, the requested documents and an indication that the one or more requested documents have not been modified based on the associated first and second fingerprints to the receiving entity;

receiving, by the document storage system and from the receiving entity, a list of one or more additional documents associated with the user and required to process a user application with the receiving entity;

identifying, by the document storage system, a first subset of the required documents stored in the document storage vault;

identifying, by the document storage system, a second subset of the required documents not stored in the document storage vault; and querying, by the document storage system, the user to share the first subset of documents and notifying the user that the second subset of documents are not stored in the document storage vault.

8. The non-transitory computer readable storage medium of claim 7, wherein the document fingerprints comprise information identifying the document and document contents, the user and an associated user device, and the providing entity and wherein the receiving entity authenticates the one or more requested documents based on a comparison of the first and second fingerprints.

9. The non-transitory computer readable storage medium of claim 8, wherein the operations further comprise:

receiving, by the document storage system and from the receiving entity, one or more forms of required user authentication associated with the one or more requested documents;

querying, by the document storage system, the user via a user device to provide the one or more forms of required user authentication;

receiving, by the document storage system, user authentication information from the user device; and displaying, by the document storage system, an indication of the received authentication information in association with the one or more requested documents.

10. The non-transitory computer readable storage medium of claim 9, wherein the document fingerprints include received user authentication information.

11. The non-transitory computer readable storage medium of claim 7, wherein the operations further comprise:

receiving, by the document storage system and from a second receiving entity, a request to share at least one of the one or more documents; and wherein the operations further comprise querying, by the document storage system, a user device for permission to share the at least one document.

12. The non-transitory computer readable storage medium of claim 1, wherein the document storage system is configured to automatically obtain updated versions of user documents from providing entities and store the updated documents in association with the user in the document storage vault.

13. A computer system comprising:

one or more processors; and a non-transitory computer readable storage medium comprising computer executable instructions that when executed by one or more processors cause the one or more processors to perform operations comprising:

receiving, by a document storage system and from a providing entity, one or more documents associated with a user of the document storage system and metadata for each of the one or more documents;

generating, by the document storage system for each of the one or more documents, a first document fingerprint using the received metadata;

storing, by the document storage system, the one or more documents and corresponding fingerprints in a document storage vault in association with the user, wherein the user is unable to modify documents stored in the document storage vault;

receiving, by the document storage system, a request from the user to share at least one of the one or more documents with a receiving entity;

determining, by the document storage system, that the user has provided permission to share the requested documents with the receiving entity;

generating, by the document storage system, a second document fingerprint for each of the requested documents using document metadata stored in the document storage vault;

sending, by the document storage system, the requested documents and an indication that the requested documents have not been modified based on the associated first and second fingerprints to the receiving entity;

identifying by the document storage system, a first subset of the required documents stored in the document storage vault;

identifying, by the document storage system, a second subset of the required documents not stored in the document storage vault; and querying, by the document storage system, the user to share the first subset of documents and notifying the user that the second subset of documents are not stored in the document storage vault.

14. The computer system of claim 13, wherein the document fingerprints comprise information identifying the document and document contents, the user and an associated user device, and the providing entity and wherein the receiving entity authenticates the one or more requested documents based on a comparison of the first and second fingerprints.

15. The computer system of claim 14, wherein the operations further comprise:

receiving, by the document storage system and from the receiving entity, one or more forms of required user authentication associated with the one or more requested documents;

querying, by the document storage system, the user via a user device to provide the one or more forms of required user authentication;

receiving, by the document storage system, user authentication information from the user device; and displaying, by the document storage system, an indication of the received authentication information in association with the one or more requested documents.

16. The computer system of claim 15, wherein the document fingerprints include received user authentication information.

17. The computer system of claim 13, wherein the operations further comprise:

receiving, by the document storage system and from a second receiving entity, a request to share at least one of the one or more documents; and querying, by the document storage system, a user device for permission to share the at least one document.

\* \* \* \* \*